Dec. 6, 1960     W. L. MINTO     2,963,357
FERTILITY POTENTIATING PROCESS
Filed Nov. 6, 1956
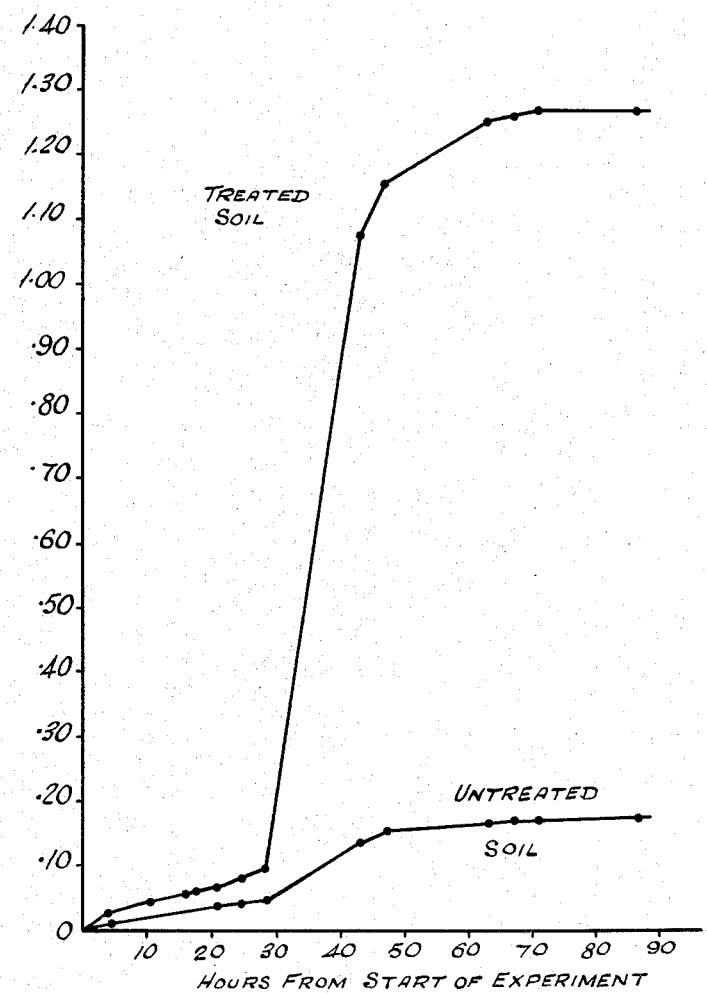
INVENTOR
WALLACE L. MINTO
BY *Stanley Molder*
ATTORNEY United States Patent Office 2,963,357
Patented Dec. 6, 1960

2,963,357

FERTILITY POTENTIATING PROCESS

Wallace L. Minto, Westwood, N.J., assignor to IBC Research Laboratories, Inc., New York, N.Y., a corporation of New York Filed Nov. 6, 1956, Ser. No. 620,580

2 Claims. (Cl. 71—1)

The present invention relates to an improved method for increasing the fertility of a growing medium and to an improved growing medium.

It is thus a principal object of the present invention to provide a novel method for improving the properties of a plant growing medium.

Another object of the present invention is to provide an improved plant growing medium.

Still another object of the present invention is to provide an improved method for increasing the fertility of a plant growing medium as well as the improved plant growing medium.

A further object of the present invention is to provide an improved method of increasing the fertility of a plant growing medium characterized by the ease of application and the low cost of materials.

Still a further object of the present invention is to provide an improved method for increasing the fertility of a growing medium and the properties of the resulting plant, the method possessing great economic advantages.

Another object of the present invention is to provide an improved method for increasing the fertility of a plant growing medium which method is accompanied by no undesirable side effects.

The above and other objects of the present invention will become apparent from a reading of the following description, taken in conjunction with the accompanying drawing, which is a graph demonstrating the effect of beta amylose triiodide on the $CO_2$ evolution from a soil sample.

The present invention is predicated on the discovery that the addition of certain types of iodine materials to a plant growing medium is accompanied by highly unexpected and beneficial results. These results include not only a greatly increased yield and growing rate but remarkable improvements in the desirable properties of the plants such as large increases in the protein, mineral and sugar content.

Examples of iodine containing materials which may be employed in accordance with the present invention are beta amylose triiodide, iodinated galactans, and 3,5,3'-triiodo tyrosine.

These compounds are characterized by being water soluble and providing in solution the triiodide ion $I_3^-$ in a concentration normally non-toxic to plant life. In a sense, the present invention contemplates adding an iodine containing material having an ionization constant of such value that upon dissociating in a concentrated aqueous solution it provides triiodide ions and the equilibrium products thereof in sufficient concentration to increase the fertility of the growing medium and dilute enough so as not to be toxic. The range of concentration of the triiodide ions and their dissociation products should preferably be between $1 \times 10^{-5}$ and $1 \times 10^{-7}$ moles per liter.

Any suitable method may be employed in distributing the iodine compounds throughout the growing medium, particularly soil. The compound may be applied in an aqueous solution or in a dry state either alone or admixed with inert or other active ingredients. The iodine compound may advantageously be mixed with the seed or applied as a coating thereto with or without other materials.

While the exact function and mechanism of the iodine as applied in accordance with the present invention is not fully understood, it is believed that it radically increases the metabolism of the soil bacteria with its attendant advantages. The presence of the iodine may also have direct desirable effects under the plant growth and effects.

It is well recognized and it has been repeatedly demonstrated that soil microorganisms perform the following important functions:

(1) The decomposition of plant and animal residues to make their organic and inorganic components available for plant growth.

(2) The excretion of acids which dissolve mineral grains, making the minerals, including trace elements, available to the plant.

(3) The "fixation" of inert gaseous nitrogen from the air.

(4) The production and conversion of humus in the soil.

(5) The production of carbon dioxide, used by the plant in photosynthesis of sugar, starch and cellulose.

(6) The storage and transfer of soluble nutrients from mineral to humus.

(7) The transfer of soluble nutrients from humus to plant.

(8) The production of vitamins, auxins and plant growth promoting substances.

(9) The production of buffering compounds with nutrients which stabilize the concentration of nutrient ions in the soil solution.

(10) The improvement of soil structure to increase its water-holding capacity and permit better aeration of plant roots.

Thus, any increase in the activity of the soil microorganisms would be highly desirable. The application of iodine to the soil in the manner of the present invention increases this activity manifold and is attended by a radical improvement in the growth and quality of the plant.

It has been long established that the evolution of $CO_2$ is a direct measurement of the metabolism of microorganisms and this fact is conventionally employed to effect the measurement of the metabolic activity of microorganisms. The graph shown in the accompanying drawing illustrates the effects of beta amylose triiodide on the evolution of $CO_2$ from soil as compared with similar untreated soil. In performing the tests resulting in the data for this graph a sample of thoroughly mixed soil was divided into two equal portions. A small amount of beta amylose triiodide was added to one portion (50 mg. per kilo of soil), the other portion was used as the control. Carbon dioxide-free air was slowly passed through each portion and the carbon dioxide evolution of each sample was measured at four hour intervals. Within a few hours the beta amylose triiodide treated sample began to give off much more $CO_2$ than the control sample. The beta amylose triiodide induced activity soon was four or five hundred percent greater than the control and this difference was maintained throughout.

Beta amylose triiodide has a very low order of toxicity due to the presence of iodine ions even when present in a concentrated or saturated state. However, when applied to the soil it provides iodine ions in an amount sufficient to greatly increase the metabolic activity of the soil microorganisms. The solubility and ionization constant of this compound is such as to afford this great increase in metabolism without the danger of the toxic excess of the iodine ion either to the plant or the microorganisms. This buffering action of the iodine compound which automatically regulates the concentration of the iodine ions within the required limits is an important feature of the present invention.

The effectiveness of the application of beta amylose triiodide and compounds of this nature to a growing medium can be appreciated when it is realized that as little as one pound per acre of this compound even under unfavorable conditions increases the release of available nitrogen by 33%, phosphorus by 50% and iron by 61% in addition to corresponding improvements and increases in available essential and desirable substances as previously set forth.

The effects of the application of the triiodide of beta amylose to soil as reflected by the yield, growth rate and quality of the end product is given in the following examples.

Thomas Laxton variety of peas were grown on four untreated plots and on four corresponding plots treated with beta amylose triiodide at the rate of one pound of beta amylose triiodide per acre with the following results:

|  | Control plots, lbs. | Treated, lbs. | Percent increase |
| --- | --- | --- | --- |
| Total weight of vegetation | 12,700 | 17,800 | 40 |
| Weight of berries | 1,690 | 2,060 | 22 |

The following results were observed in the growth of hemp on a 40 acre test field:

AVERAGE HEIGHT OF PLANTS

*Beta amylose triiodide dosage (grams per acre)*

| Growing Time in Days | Control, No Beta Amylose Triiodide | 125 Grams | 250 Grams | 375 Grams | 500 Grams | 625 Grams |
| --- | --- | --- | --- | --- | --- | --- |
|  | Inches | Inches | Inches | Inches | Inches | Inches |
| 15 | 3 | 3 | 3 | 3 | 3 | 3 |
| 30 | 11 | 11 | 12 | 13 | 14.5 | 15 |
| 45 | 20 | 19 | 21 | 21.5 | 23 | 27 |
| 60 | 38 | 39 | 42 | 40 | 46 | 46 |
| 75 | 58 | 57 | 60 | 61 | 73 | 74 |
| 90 | 71 | 71 | 74 | 88 | 94 | 100 |
| 104 | 75 | 76 | 81 | 94 | 97 | 102 |

| Fiber Production | | Distance Between Nodes (Fiber Length Increase) | |
| --- | --- | --- | --- |
| Beta Amylose Triiodide, Dosage Per Acre | Pounds Fiber Per Acre | Beta Amylose Triiodide Dosage Per Acre | Average Distance (Inches) |
| Control | 1,117 | Control | 7.9 |
| 125 grams | 1,090 | 125 grams | 8.0 |
| 250 grams | 1,187 | 250 grams | 8.8 |
| 375 grams | 1,351 | 375 grams | 11.9 |
| 500 grams | 1,428 | 500 grams | 13.7 |
| 625 grams | 1,417 | 625 grams | 13.9 |

In other tests employing the beta amylose triiodided at the rate of one pound per acre the yield of peas was increased by 71%, carrots more than 200%, strawberries 69%, etc.

In addition to an increase in productivity the use of the beta amylose triiodide contributes to a marked increase in the vitamin and protein content of the produce as well as other constituents, greater chlorophyll production and subjectively better flavor and texture.

Analysis of produce grown in beta amylose triiodide treated soil as compared to that grown in untreated soil showed a 6.6% increase in mineral content and a 53% increase in natural sugar content in Ponderosa tomatoes; in strawberries, 38% higher mineral content, 48% higher reduceable fruit sugars, 62% more iron and 74% more calcium.

Results of tests conducted in the growth of oats are as follows:

Method: Beta Amylose Triiodide was applied with spray after dissolution in 30 gallons of water. Applied to test plots (160' x 165') when plants were about 6 inches high.

Soil: Heavy black loam—unbalanced; phosphate low, lime low, organic matter low; potash wild; pH about 5.5.

|  | 4–16–16 | 4–16–16 beta amylose triiodide |
| --- | --- | --- |
| Marion Oats | Moisture 11.00%<br>Protein 10.70% | Moisture 10.90%.<br>Protein 13.10%. |
|  | No Supplementation | Beta amylose triiodide only |
| Clinton Oats | Moisture 10.80%<br>Protein 13.60% | Moisture 10.80%.<br>Protein 16.20%. |
|  | 0–20–0 | 0–20–0 plus Beta Amylose Triiodide |
| Clinton Oats | Moisture 10.80%<br>Protein 13.60% | Moisture 10.80%.<br>Protein 15.10%. |
|  | Pulv. Lime | Pulv. Lime plus Beta Amylose Triiodide |
| Clinton Oats | No Data | Moisture 10.10%.<br>Protein 15.40%. |
|  | Rock Phosphate | Rock Phosphate plus Beta Amylose Triiodide |
| Clinton Oats | Moisture 10.50%<br>Protein 12.90% | Moisture 10.50%.<br>Protein 16.30%. |

The nutritive value of produce was tested on purebred laboratory animals. One group was fed only produce raised on soil treated with one pound per acre of beta amylose triiodide. A second, identical group was fed only produce raised with conventional chemical fertilizer. At the end of 57 days, when all were sacrificed for autopsy, the animals fed on beta amylose triiode-raised produced showed a 105% greater net gain of body weight than the conventional fertilizer controlled group. They were in far better condition, with superior bone and tooth structure. The control group exhibited thyroid hyperplasia and generally poor development. Analyses showed that the use of beta amylose triiodide increased the nutritive iodine content of the produce.

As indicated previously, the iodine compound may be mixed with the seed, mixed with fertilizer, applied in solution or incorporated in pellet covers. For example, beet seed which are commonly sown five pounds of seed to the acre would be mixed with beta amylose triiodide, five pounds of seed to one pound of the iodine compound. The seed may be tumbled with the compound to effect thorough admixing. When mixed with fertilizer the beta amylose triiodide should not be mixed with lime, limestone, ashes or burnt bone meal.

While the above examples have been given in connection with the use of beta amylose triiodide other iodide compounds may be employed possessing similar ionization characteristics. Beta amylose triiodide appears to ionize to provide $I_3^-$ ions which in turn dissociate to provide $I_2$ and $I^-$ ions. A saturated aqueous solution of the beta amylose triiodide provides $5 \times 10^{-7}$ moles per liter of $I_{-3}$ ions and its dissociation products. The use of the beta amylose triiodide and hence this ion concentration has been demonstrated as being remarkably effective. Beta amylose triiodide is highly water soluble and as the iodine is consumed further ionization occurs thereby by providing a substantially constant regulated and buffered iodine ion concentration. The preferable range of the iodine ion concentration as above defined is between $10^{-5}$ and $10^{7-}$ moles per liter. The amount and concentration of the iodine compound employed should preferably provide at least $10^{-7}$ moles per liter of the iodine ion. Examples of other iodine compounds which may be employed are 3,4,3' triiodo tyrosine and ionated galactans. The iodinated galactans may be produced in the manner employed in producing beta amylose triiodine or in any other suitable manner.

While there has been described preferred embodiments of the present invention, it should be understood that numerous alterations and omissions may be made without departing from the spirit thereof.

What is claimed is:
1. A method of increasing soil bacteria activity which comprises applying to the soil 3,5,3' triiodide tyrosine.
2. A method of increasing soil bacteria activity which comprises applying to the soil iodinated galactans.

References Cited in the file of this patent

UNITED STATES PATENTS

| | | |
|---|---|---|
| 2,270,518 | Ellis | Jan. 20, 1942 |
| 2,280,451 | Riddle | Apr. 21, 1942 |
| 2,383,334 | Minto | Aug. 21, 1945 |
| 2,540,486 | Minto | Feb. 6, 1951 |
| 2,770,538 | Vierling | Nov. 13, 1956 |